United States Patent
Parvania et al.

(10) Patent No.: US 10,296,030 B2
(45) Date of Patent: May 21, 2019

(54) SYSTEMS AND METHODS FOR POWER SYSTEM MANAGEMENT

(71) Applicants: University of Utah Research Foundation, Salt Lake City, UT (US); Arizona Board of Regents for and on behalf of Arizona State University, Scottsdale, AZ (US)

(72) Inventors: Masood Parvania, Salt Lake City, UT (US); Anna Scaglione, Tempe, AZ (US)

(73) Assignees: University of Utah Research Foundation, Salt Lake City, UT (US); Arizona Board of Regents for and on behalf of Arizona State University, Scottsdale, AZ (US)

( * ) Notice: Subject to any disclaimer, the term of this patent is extended or adjusted under 35 U.S.C. 154(b) by 53 days.

(21) Appl. No.: 15/289,121

(22) Filed: Oct. 7, 2016

(65) Prior Publication Data

US 2017/0102725 A1   Apr. 13, 2017

Related U.S. Application Data

(60) Provisional application No. 62/284,756, filed on Oct. 7, 2015, provisional application No. 62/284,765, filed on Oct. 8, 2015.

(51) Int. Cl.
*G05F 1/66* (2006.01)
*H02J 3/00* (2006.01)

(52) U.S. Cl.
CPC ............. *G05F 1/66* (2013.01); *H02J 3/00* (2013.01); *H02J 2003/003* (2013.01);
(Continued)

(58) Field of Classification Search
CPC .............. G05F 1/66; G05B 13/026; G05B 2219/40458
See application file for complete search history.

(56) References Cited

U.S. PATENT DOCUMENTS

| | | |
|---|---|---|
| 7,343,360 B1 | 3/2008 | Ristanovic et al. |
| 8,639,392 B2 | 1/2014 | Chassin |

(Continued)

OTHER PUBLICATIONS

Forecasting hourly electricity demand using time-varying splines, Andrew Harvey and Siem Jan Koopman, Journal of the American Statistical Association; Dec. 1993; 88, 424; ProQuest; p. 1228-1236.*

(Continued)

*Primary Examiner* — Christopher E. Everett
(74) *Attorney, Agent, or Firm* — Workman Nydegger

(57) ABSTRACT

An operating configuration for a power system during a particular time period may be derived from a net load forecast for the power system during the particular time period. The operating configuration may be based on characteristics of power generation units (PGUs) available within the power system (e.g., power generators). The characteristics of a PGU may include a generation trajectory for the PGU that defines, inter alia, power generated by the PGU as the PGU ramps up power production within the power system. The generation trajectory of PGUs may be evaluated in view of the net load forecast to ensure that adequate power resources are available within the power system and avoid ramping scarcity conditions.

20 Claims, 5 Drawing Sheets

(52) U.S. Cl.
CPC ......... *H02J 2003/007* (2013.01); *Y02E 60/76* (2013.01); *Y04S 40/22* (2013.01)

(56) References Cited

U.S. PATENT DOCUMENTS

| | | | |
|---|---|---|---|
| 8,862,279 B2 | 10/2014 | Darden, II et al. | |
| 8,886,362 B2 | 11/2014 | Krok et al. | |
| 8,938,320 B2 | 1/2015 | Ooba et al. | |
| 9,020,649 B2 | 4/2015 | Sharma et al. | |
| 9,159,042 B2 | 10/2015 | Steven et al. | |
| 9,300,141 B2 | 3/2016 | Marhoefer | |
| 9,312,698 B2 | 4/2016 | Subbotin et al. | |
| 9,367,825 B2 | 6/2016 | Steven et al. | |
| 9,395,741 B2 | 7/2016 | Shiga et al. | |
| 9,509,176 B2 | 11/2016 | Carter et al. | |
| 2002/0165816 A1 | 11/2002 | Barz | |
| 2004/0181460 A1 | 9/2004 | Bjelogrlic et al. | |
| 2004/0215529 A1 | 10/2004 | Foster et al. | |
| 2004/0260489 A1* | 12/2004 | Mansingh | G06Q 50/06 702/60 |
| 2004/0267404 A1* | 12/2004 | Danko | B25J 9/1607 700/245 |
| 2005/0165948 A1 | 7/2005 | Hatime | |
| 2005/0285574 A1 | 12/2005 | Huff et al. | |
| 2007/0244604 A1* | 10/2007 | McNally | G06Q 50/06 700/291 |
| 2009/0062969 A1 | 3/2009 | Chandra et al. | |
| 2009/0281876 A1 | 11/2009 | Bullinger et al. | |
| 2011/0029141 A1* | 2/2011 | Sun | H02J 3/00 700/291 |
| 2011/0035071 A1 | 2/2011 | Sun et al. | |
| 2011/0066391 A1* | 3/2011 | AbuAli | G06Q 10/06 702/61 |
| 2011/0071690 A1 | 3/2011 | Sun et al. | |
| 2011/0213739 A1* | 9/2011 | Benitez | G01D 4/004 706/12 |
| 2012/0101639 A1* | 4/2012 | Carralero | G06F 1/26 700/286 |
| 2012/0253532 A1 | 10/2012 | McMullin et al. | |
| 2013/0006439 A1* | 1/2013 | Selvaraj | G06Q 10/06 700/297 |
| 2013/0190938 A1 | 7/2013 | Zadeh et al. | |
| 2014/0005852 A1 | 1/2014 | Asghari et al. | |
| 2014/0039710 A1 | 2/2014 | Carter et al. | |
| 2014/0277797 A1 | 9/2014 | Mokhtari et al. | |
| 2015/0051746 A1* | 2/2015 | Mathiesen | H02J 3/14 700/291 |
| 2015/0057821 A1* | 2/2015 | Nasle | G06Q 10/04 700/291 |
| 2015/0127425 A1 | 5/2015 | Greene et al. | |
| 2015/0192697 A1* | 7/2015 | Hosking | G01W 1/10 702/3 |
| 2015/0206083 A1 | 7/2015 | Chen et al. | |
| 2015/0316907 A1* | 11/2015 | Elbsat | G06Q 10/04 700/275 |
| 2017/0109674 A1 | 4/2017 | Parvania | |
| 2018/0217568 A1 | 8/2018 | Parvania | |

OTHER PUBLICATIONS

Uplift in RTO and ISO Markets, FERC—Federal Energy Regulatory Commission, Staff Analysis of Uplift in RTO and ISO Markets, Aug. 2014, 46 pages.

Auroraxmp, et al., AURORAxmp Comprehensive Power Forecasting, The World Standard for Power Market Simulation, Forecasting and Analysis, brochure, 12 pages.

Parvania, et al., Continuous-Time Marginal Pricing of Electricity, IEE Transactions on Power Systems, 2016, 10 pages http://dx.doi.org/10.1109/TPWRS.2016.2597288.

Parvania, et al., Generation Ramping Valuation in Day-Ahead Electricity Markets, 2016 49th Hawaii International Conference on System Sciences, doi 10/1109/HICSS.2016.292, pp. 2335-2344.

Mehta, et al., Industrial Process Automation Systems, Butterworth-Heinemann, Nov. 26, 2014.

Parvania, et al., Office Action dated Jun. 26, 2018 for U.S. Appl. No. 15/396,363.

Wang, et al., Effects of Ramp-Rate Limits on Unit Commitment and Economic Dispatch, In IEEE Transactions on Power Systems, vol. 8, No. 3, pp. 1341-1350, Aug. 1993.

Wang, et al., Optimal Generation Scheduling with Ramping Costs, Conference Proceedings Power Industry Computer Application Conference, Scottsdale, AZ, 1993, pp. 11-17.

Notice of Allowance U.S. Appl. No. 15/396,363 dated Jan. 9, 2019.

\* cited by examiner

SYSTEMS AND METHODS FOR POWER SYSTEM MANAGEMENT

CROSS-REFERENCE TO RELATED APPLICATIONS

This application claims priority to U.S. Provisional Patent Application No. 62/284,756 filed Oct. 7, 2015, and to U.S. Provisional Patent Application No. 62/284,765 filed Oct. 8, 2015, each of which is hereby incorporated by reference in its entirety.

STATEMENT REGARDING FEDERALLY SPONSORED RESEARCH

This invention was made with government support under 1549924 awarded by the National Science Foundation. The government has certain rights in the invention.

TECHNICAL FIELD

This disclosure relates to systems and methods for managing a distributed power system and, more particularly, to systems and methods for configuring power system resources in accordance with continuous-time demand.

BACKGROUND

Discrete-time demand models for power system management may not accurately reflect continuous-time variations in net load and/or power generation and ramping characteristics. These deficiencies may diminish the ability of the power system to respond to real-time load fluctuations, and may increase the likelihood of scarcity conditions. Therefore, what is needed are systems and methods to enable a power system to respond to sub-interval load fluctuations and prevent ramping scarcity conditions.

SUMMARY

Disclosed herein are systems and methods for managing a power system. The disclosed systems and methods may comprise determining a net load forecast for a power system, the net load forecast corresponding to a sequence of net load samples, each net load sample defining a linear net load on the power system during a respective time interval within an operating period of the power system, wherein determining the net load forecast further comprises, modeling a non-linear variance of the net load on the power system within one or more time intervals of the net load samples. The sequence of net load samples may comprise comprises an hourly day-ahead load forecast for the power system.

In some embodiments, the disclosed systems and methods further comprise formulating a generation trajectory to configure one or more power generation units to satisfy the determined net load forecast for the power system, including the non-linear variance of the net load modeled within the one or more time intervals, and configuring the one or more power generators to generate power in accordance with the determined power generation trajectory during the operating period. In some embodiments, the disclosed systems and methods further comprise configuring transmission infrastructure of the power system to accept power generated by the one or more power generators during the operating period by, inter alia, configuring the one or more power generators to generate power for the power system according to one or more of: a specified generation trajectory and specified ramping trajectory. The disclosed systems and methods may be configured to model the non-linear variance of the net load by projecting the net load samples into a cubic spline function space. In some embodiments, formulating the generation trajectory comprises projecting generation trajectories of each of a plurality of power generation units into the cubic spline function space. The disclosed systems and methods may further comprise determining an optimal solution to the unit commitment model, wherein the optimal solution to the unit commitment model determines generation trajectory of the one or more power generation units.

DETAILED DESCRIPTION OF PREFERRED EMBODIMENTS

Figure 1:
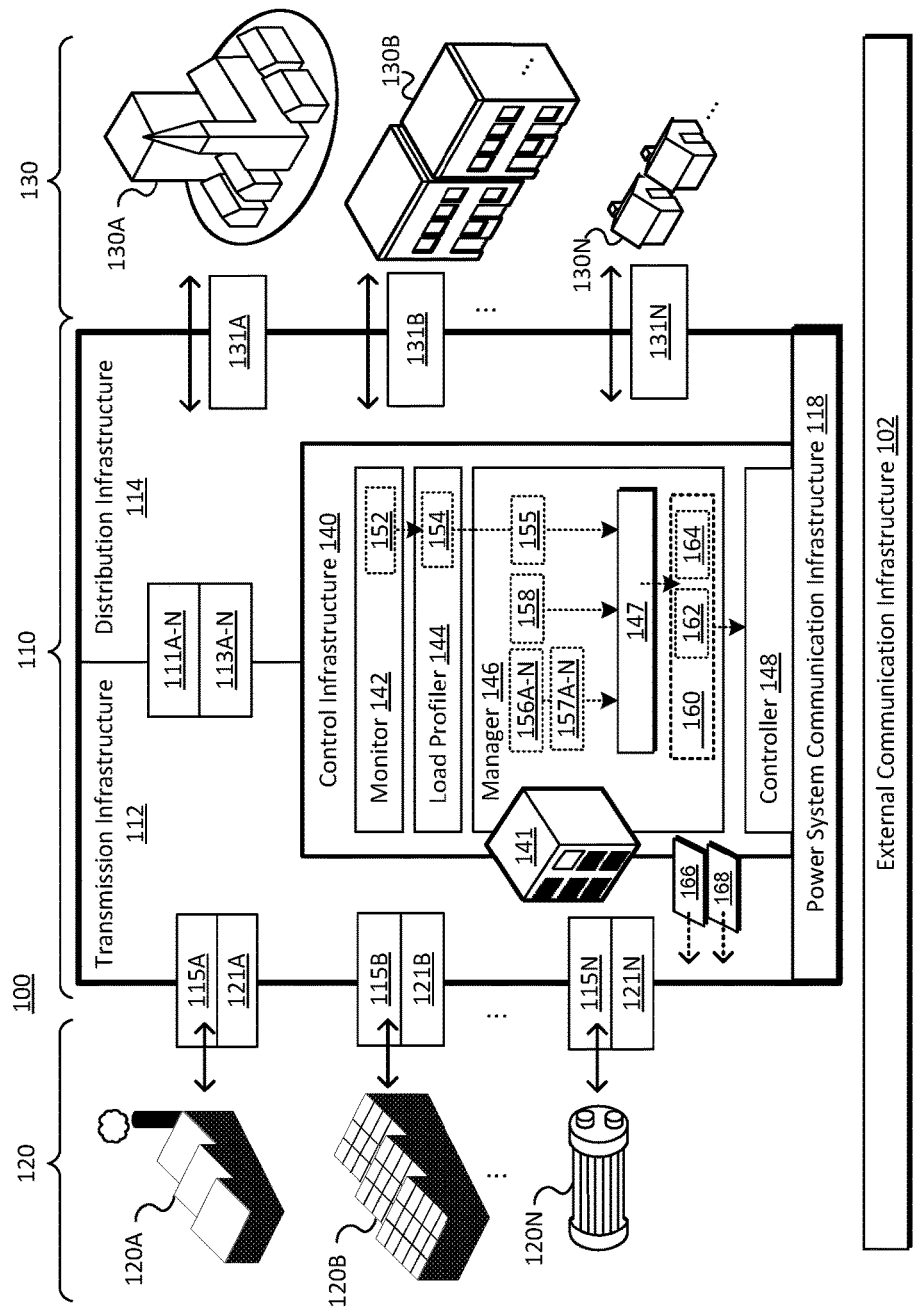
FIG. 1 is a schematic block diagram of one embodiment of a power system comprising a controller configured to manage power generation resources.

Disclosed herein are embodiments of systems and methods for managing a power system. A power system may be configured to distribute power to a load. The load may consume electrical power distributed thereto through distribution infrastructure of the power system. The load may comprise any entity configured to consume electrical power including, but not limited to: homes, businesses, factories, power storage systems, and the like.

The power system may be configured to acquire electrical power for distribution to the load from one or more power generating units. As used herein, a power generating unit (PGU) refers to any entity capable of providing electrical power to the power system. A PGU may include, but is not limited to: a fossil-fuel power generator (e.g., a natural gas generator, a coal-fired power plant, or the like), a renewable energy power generator (e.g., a hydroelectric generator, a solar power generator, a wind power generator, or the like), a nuclear power generator, a power storage system (e.g., a battery storage system), and/or the like. The power system may be capable of being electrically coupled to a plurality of different PGUs. Each PGU may be capable of being electrically coupled to the power system at respective locations (e.g., bus locations within power transmission infrastructure of the power system). Moreover, each PGU may have respective power generation characteristics. As used herein, a "characteristic" of a PGU may refer to any aspect of power generated by the PGU including, but not limited to: a maximum amount of power capable of being produced by the PGU at a given time and/or under given conditions (e.g., $P_{MAX}(t, c)$ where t is time and c is particular operating conditions); a minimum amount of power that can be provisioned from the PGU at a given time and/or under given conditions (e.g., $P_{MIN}(t, c)$); ramping trajectory characteristics that define, inter alia, the rate at which the PGU can ramp up power production to the power system as a function of time, under given operating conditions (e.g., from $R_{MAX}(t, c)$ to $R_{MIN}$); location characteristics corresponding to the location(s) at which the PGU can be electrically coupled to the power system (e.g., bus locations at which the PGU is capable of being electrically coupled to transmission infrastructure of the power system); cost characteristics determining a cost for power provided by the PGU as a function of time and/or at given operating conditions (e.g., overall demand); and so on.

The power system may be configured to provision electrical power to satisfy discrete and/or piecewise linear net load forecast values (e.g., according to a Unit Commitment (UC) model). The power system may be configured to determine an estimate of power resources required to satisfy the load on the power system over a particular time period (e.g., the next day). The UC model may be used to determine an "optimal" configuration of PGUs to provide power to satisfy net load requirements on an hourly basis. The optimal configuration may be based on characteristics of the PGU, operating constraints of the PGU, constraints of the power system (e.g., transmission constraints, power flow constraints, and so on). A day-ahead UC model for a power system may be implemented as an instance of mixed-integer linear programming (MILP) in which the generation cost function (constraints of the PGU), and other operating constraints are modeled and from which an "optimal" configuration of PGUs for the power system is derived. An "optimal" configuration may comprise scheduling a PGU to provide power to the power system during the particular time period (e.g., during the next day). The "optimal solution" may, therefore, comprise determining hourly decision variables for each PGU that define how the PGU is to be used to satisfy the demand on the power system during real-time operation. The hourly decision variable for a PGU may include an hourly commitment schedule for the PGU, an hourly generation schedule for the PGU, and so on. The power system may use the "optimal solution" for the day-ahead UC for real-time operation of the power system over the particular time period (e.g., during the next day).

The actual load on the power system may deviate from the day-ahead UC model, which may result in scarcity conditions (e.g., conditions in which the power system has insufficient capacity to satisfy demand). Scarcity conditions may be caused by defects in the UC model itself and, in particular, inaccuracies in modeling net load on the power system, generation trajectory, and so on.

Disclosed herein are embodiments of power system controller infrastructure 140 configured to determine a configuration for the power system adapted to avoid scarcity events by, inter alia, modeling ramping events and/or ramping constraints of the PGU available to the power system. The power system controller may be configured to determine a load profile approximation for the power system in which PGU ramping events and constraints are modeled in intertemporal, continuous-time. The power system controller may determine an "optimal" configuration for the power system based on continuous-time load profile approximations of the PGU, and may use the determined configuration for real-time operation of the power system.

FIG. 1 is a schematic diagram of one embodiment of a power system 100. The power system 100 may comprise power system infrastructure 110. The power system infrastructure 110 may comprise a configurable network or grid for the transmission and distribution of electrical power. The power system infrastructure 110 may comprise transmission infrastructure 112 configured to transfer electrical power from one or more power generating units (PGUs) 120 into the power system 100 and distribution infrastructure 114 to distribute electrical power to a load 130. The power system infrastructure 110 may comprise hardware components configured to transmit and/or distribute electrical power, which may include, but are not limited to: transmission lines (e.g., low voltage power lines, high voltage power lines, extra high voltage power lines, three-phase transmission lines, etc.), transformers, substations, switches, buses, bus bars, power conditioners, and/or the like.

The power system infrastructure 110 may comprise power system communication infrastructure 118, which may be configured to communicatively couple monitoring and/or control computing devices (MCCDs) of the power system 100. As used herein, an MCCD refers to a computing device configured for use within the power system infrastructure 110. An MCCD may be a computing device comprising processing resources, memory resources, non-transitory storage resources, communication resources (e.g., interfaces to communicatively couple the MCCD to one or more electronic communication networks), human-machine interface (HMI) components, and/or the like. The processing resources of an MCCD may comprise one or more general purpose processors, one or more special purpose processors (e.g., monitoring and/or communications processors), programmable logic (e.g., a field-programmable gate array), and/or the like. The memory resources of an MCCD may comprise volatile memory, firmware, and/or the like. The non-transitory storage resources of an MCCD may comprise one or more storage devices configured to store data on a non-transitory storage media, such as a hard disk, solid-state storage (Flash memory storage), battery-backed memory, and/or the like. The communication resources of an MCCD may comprise one or more network interfaces configured to communicatively couple the MCCD to one or more electronic communication networks of one or more of the power system communication infrastructure 118, an external communication infrastructure 102, and/or the like. The power system communication infrastructure 118 may comprise any suitable electronic networking infrastructure including, but not limited to: an electronic communication network, a private electronic communication network, a local area network, a wide-area network, a wireless network, a cellular data network, a wide area control system (WACS), a Supervisory Control and Data Acquisition (SCADA) system, and/or the like. Portions of the power system communication infrastructure 118 and/or computing devices deployed within the power system infrastructure 110 may be communicatively coupled to an external communication infrastructure 102, which may comprise one or more public and/or private electronic communication networks, such as the Internet, a private network of one or more of the PGUs 120A-N, and/or the like.

The power system infrastructure 110 may further comprise control infrastructure 140, which may be configured to monitor, manage, and/or configure the power system 100. The control infrastructure 140 may comprise a power system monitor 142 (or monitor 142), a load profiler 144, a power system configuration manager 146 (or manager 146), and controller 148, which are described in further detail herein.

The control infrastructure 140 may comprise hardware components, such as a computing device 141. The computing device 141 may comprise an MCCD, as disclosed herein. The computing device 141 may comprise processing resources, memory resources, non-transitory storage resources, HMI components, communication resources, and/or the like. The individual components of the computing device 141 are not depicted in FIG. 1 to avoid obscuring details of the disclosed embodiments. The computing device 141 may be communicatively coupled to the power system communication infrastructure 118 and/or the external communication infrastructure 102.

Portions of the control infrastructure 140 (e.g., portions of the monitor 142, load profiler 144, manager 146, controller 148, and so on) may be embodied as computer-readable instructions stored on non-transitory storage resources of the computing device 141. The instructions may be configured to cause the computing device 141 to perform operations and/or processing steps for monitoring, managing, and/or configuring the power system 100, as disclosed herein. Alternatively, or in addition, portions of the control infrastructure 140 (e.g., portions of the monitor 142, load profiler 144, manager 146, controller 148, and/or the like) may be embodied as separate hardware components and/or devices, firmware, hardware configuration data, and/or the like.

The monitor 142 may be configured to monitor portions of the power system 100 (e.g., monitor one or more of the PGUs 120A-N, the transmission infrastructure 112, the distribution infrastructure 114, the load 130, and so on). The monitor 142 may comprise an MCCD, as disclosed herein. The MCCD is not depicted in FIG. 1 to avoid obscuring the details of the disclosed embodiments. The monitor 142 may comprise and/or be communicatively coupled to one or more monitoring devices 111A-N, 121A-N, and/or 131A-N, which may be configured to monitor respective portions of the power system 100. The monitoring devices 111A-N, 121A-N, and/or 131A-N may include, but are not limited to: current sensors, voltage sensors, power sensors, phase sensors (current and/or voltage phase measurement devices), temperature sensors, fault detection devices (e.g., over current detectors, over-voltage detectors, arc flash detectors, etc.), fault recorders, phasor measurement devices, phasor measurement and control devices, relays, protective relays, fail-over devices, and/or the like. One or more of the monitoring devices 111A-N, 121A-N, and/or 131A-N may comprise an MCCD, as disclosed above. Accordingly, one or more of the monitoring devices 111A-N, 121A-N, and/or 131A-N may be configured to control one or more components of the power system 100 (e.g., control one or more switches, buses, bus bars, and/or the like).

The monitoring devices 111A-N may be configured to monitor portions of the power system infrastructure 110 (e.g., the transmission infrastructure 112, distribution infrastructure 114, and so on), which may include, but is not limited to monitoring: transmission lines, transformers, substations, switches, buses, bus bars, power conditioners, relays, protective relays, and/or the like. Although FIG. 1 depicts a single monitoring device 111A-N to avoid obscuring the details of the illustrated embodiments, the power system 100 could comprise any number of monitoring devices 111A-N configured to monitor and/or control any portion of the power system infrastructure 110.

The monitoring devices 121A-N may be configured to monitor one or more of the PGUs 120A-N, which may comprise monitoring power being generated by respective PGUs 120A-N, monitoring a generation and/or ramping trajectory of the PGUs 120A-N (as disclosed in further detail herein), monitoring PGU interface devices 115A-N (described in further detail herein), and/or the like.

The monitoring devices 131A-N may be configured to monitor the load 130 of the power system 100, which may include, but is not limited to: monitoring power consumed by the load 130 on the power system, monitoring power consumed within respective load regions 130A-N of the power system 100, monitoring power loss within the power system infrastructure 110, and/or the like. As used herein a "load region" 130A-N refers to a portion of the load 130 on the power system 100. A load region 130A-N may correspond to a portion of the load 130 associated with a particular geographical area, a particular electrical network (e.g., a particular substation), and/or the like. The monitoring devices 131A-N may be configured to monitor power consumption of the power system at particular times (e.g., particular times of day), at a discrete monitoring interval (e.g., hourly), monitor power consumption in continuous-time, and/or the like.

The monitor 142 may be communicatively coupled to the monitoring devices 111A-N, 121A-N, and/or 131A-N by use of the power system communication infrastructure 118 and/or an external communication infrastructure 102. The monitor 142 may be configured to acquire monitoring data 152 pertaining to the power system 100 from the monitoring device 111A-N, 121A-N, and/or 131A-N. As disclosed above, the monitor 142 may comprise an MCCD. The monitor 142 may be configured to record and/or store monitoring data 152 in a memory, in non-transitory storage, and/or the like. The monitor 142 may be configured to display portions of the monitoring data 152 on HMI components of the MCCD and/or transmit portions of the monitoring data 152 on an electronic communication network (by use of the communication resources of the MCCD). The monitor 142 may be further configured to communicate portions of the monitoring data 142 within the control infrastructure 140. As disclosed in further detail herein, the monitor 142 may provide monitoring data 152 pertaining to power consumption to the load profiler 144, which may use the monitoring data 152 to determine a load profile 154 for the power system 100.

The power system controller (controller 148) may be configured to monitor, manage, and/or configure the power system 100 during real-time operation. The controller 148 may comprise a "real-time" or "operating" controller of the power system 100. The controller 148 may be configured to monitor, manage, and/or configure selected PGUs 120A-N to generate electrical power for the power system 100. The controller 148 may be further configured to monitor, manage, and/or configure the power system infrastructure 110 to distribute power being generated by the selected PGUs 120A-N to the load 130. In some embodiments, the controller 148 configures the power system 100 to operate according to a power system configuration 160. As disclosed in further detail herein, the power system configuration 160 may comprise an "optimal" configuration of the power system 100 during an operating period (e.g., a day). The power system configuration 160 may comprise a PGU configuration 162 adapted to, inter alia, configure and/or schedule selected PGUs 120A-N to generate power for the power system 100 during the operating period. The PGU configuration 162 may be adapted such that power generated by selected PGUs 120A-N during the operating period satisfies the power requirements of the power system 100. The power system configuration 160 may further comprise infrastructure configuration 164 adapted to, inter alia, configure the power system infrastructure 110 in accordance with the PGU configuration 162. The infrastructure configuration 164 may be adapted to configure the transmission infrastructure 112 to accept power generated by the selected PGUs 120A-N in accordance with the PGU configuration 162, configure the distribution infrastructure 114 to distribute the power to the load 130, and so on.

The load profiler 144 may be configured to determine a load profile 154 for the power system 100, which may comprise a forecast of the "net load" on the power system 100 during a particular operating period. As used herein, the "net load" refers to power consumption within the power system 100 during a particular operating period (e.g., during a day). The net load on the power system 100 may comprise power consumed by the load 130, power losses within the power system infrastructure 110, and so on.

The load profiler 144 may be configured to determine the load profile 154 for the power system 100 based on any number of factors including, but not limited to: net load on the power system 100 during a current operating period (e.g., current day), net load on the power system 100 during one or more previous operating periods (e.g., previous days), environmental information (e.g., weather conditions in geographical regions serviced by the power system 100), load scheduling (e.g., scheduling for high load regions 130A-N, such as a factory), calendar information (e.g., weekends versus weekdays, holidays, events, and so on), heuristics, testing and experience, and/or the like.

The load profiler 144 may be configured to monitor the net load on the power system 100 by, inter alia, monitoring power consumption by use of the monitor 142 and/or monitoring devices 111A-N, 121A-N, and/or 131A-N. The load profiler 144 may be configured to monitor power consumption during real-time operation of the power system 100, which may include monitoring power consumed by the load 130 (and/or particular load regions 130A-N), monitoring power losses within the power system infrastructure 110, and so on. The load profiler 144 may be further configured to record power consumption monitoring data in a memory, non-transitory storage, and/or the like. The load profiler 144 may be configured to record power consumption monitoring data comprising one or more of: measurements of power consumption at particular times (e.g., measurements of power consumption at predetermined times of day), discrete-time measurements of power consumption at a particular monitoring interval or frequency (e.g., hourly power consumption), instantaneous measurements of power consumption, and/or the like. The monitoring power consumption monitoring data acquired by the load profiler 144 may comprise a sequence of power consumption samples and/or measurements quantifying power consumption at respective samples time and/or during respective monitoring intervals.

The load profiler 144 may use the monitored power consumption data to determine the load profile 154 for the power system 100. The load profile 154 may comprise a forecast of the net load for the power system during a subsequent operating period (e.g., a day-ahead load profile). As disclosed above, determining the load profile 154 may comprise evaluating a plurality of different factors including, but not limited to: power consumption monitoring data pertaining to a current operating period (e.g., current day), power consumption monitoring data pertaining to one or more previous operating periods (e.g., previous days), environmental conditions, calendar information, heuristics, testing and experience, and/or the like. The load profile 154 may comprise a day-ahead load forecast for the power system 100. The load profile 154 may comprise a collection, set, and/or sequence of net load quantities, each of which may comprise a forecast of the net load on the power system 100 at a particular time and/or during a particular interval within an operating period of the power system 100 (e.g., during a next day of operation). The net load forecast quantities may forecast the net load on the power system at respective sample times. Alternatively, or in addition, the net load forecast quantities may be interpreted as defining a load during a particular interval of operation (e.g., a piecewise linear projection of the net load on the power system during a particular time interval). In some embodiments, the load profile 154 comprises 24 hourly net load forecast quantities, each comprising a net load forecast for the power system 100 at and/or during a particular hour.

The power system configuration manager 146 (or manager 146) may determine a power system configuration 160 for operation of the power system 100 during the operating period (e.g., the next day). As disclosed above, the power system configuration 160 may comprise a PGU configuration 162 and infrastructure configuration 164. The manager 146 may adapt the PGU configuration 162 to select, configure, and/or schedule PGUs 120A-N to generate power during the operating period in accordance with the load profile 154 (e.g., to satisfy the net load forecast for the power system 100 during the operating period). The infrastructure configuration 164 may be adapted to configure the power system infrastructure 110 to accept power generated by the PGUs 120A-N (in accordance with selection, configuration and/or scheduling of the PGUs 120A-N as defined in the PGU configuration 162). The infrastructure configuration 164 may be further adapted to configure the distribution infrastructure 114 to distribute power transferred from the selected PGUs 120A-N through the transmission infrastructure 112 to the load 130 and/or particular load regions 130A-N.

The some embodiments, the manager 146 may be configured to formulate the power system configuration 160 in accordance with a day-ahead Unit Commitment (UC) model. The manager 146 may be configured to formulate a UC model based on the load profile 154, PGU metadata 156A-N, and/or power system metadata 158. The PGU metadata 156A-N may model and/or define characteristics constraints, and/or properties of respective PGUs 120A-N, which may include, but are not limited to: generation capacity (maximum and/or minimum power capable of being generated by the PGU 120A-N), location(s) at which PGUs 120A-N can be electrically coupled to the transmission infrastructure 112, cost (e.g., cost for power generated by the PGU 120A-N, startup cost, shutdown cost, and so on), generation and/or ramping characteristics (disclosed in further detail herein), and so on. The power system metadata 158 may model and/or define characteristics, constraints, and/or properties of the power system 100, including, but not limited to: operating constraints, transmission constraints (e.g., capacity of various portions of the transmission infrastructure 112 and/or distribution infrastructure 114), DC power flow constraints, topology (e.g., bus locations at which respective PGUs 120A-N are capable of being electrically coupled to the transmission infrastructure 112), and so on.

The manager 146 may schedule PGUs 120A-N to satisfy the net load forecast of the load profile 154, which may comprise an hourly schedule of the PGUs 120A-N. The manager 146 may be configured to determine "decision variables" for the PGUs 120A-N, including an hourly commitment status (whether the PGU 120A-N is to be committed for power generation during a particular hour), and a generation schedule (an amount of power to be generated for the power system by the PGU 120A-N during the particular hour). The decision variables may be used to configure the PGUs 120A-N during each interval of the operating period. The manager 146 may, therefore, be configured to generate decision variables for each PGU 120A-N during each interval of the operating period.

As disclosed above, the manager 146 may schedule PGUs 120A-N to satisfy an hourly net load forecast of the load profile 154, which may comprise scheduling PGUs 120A-N to generate a particular amount of power during respective hours. The manager 146 may formulate a power generation model (PGM) to model power generated by selected PGUs 120A-N operating according to a selected configuration (e.g., a model or function PGM(t) may model power generated by selected PGUs 120A-N at a particular time t and/or during a particular time interval). The manager 146 may select and/or schedule PGUs 120A-N during the operation period such that, for each time interval T, the power to be generated by selected PGUs 120A-N PGM(t) satisfies the net load quantity for the time interval T (e.g., PGM(T)=N(T)).

In some embodiments, the manager 146 may determine the power system configuration 160 by use of a UC model of the power system 100. The manager 146 may formulate the UC model as an instance of mixed-integer linear programming (MILP) in which a generation cost function and operating constraints (as defined in PGU metadata 156A-N and/or infrastructure metadata 158) are linear with respect to the decision variables. The manager 146 may determine the power system configuration 160 by, inter alia, determining an optimal solution for the UC model in accordance with a particular optimization criterion (e.g., optimization and/or cost function). The manager 146 may, for example, be configured to determine a power system configuration 160 that satisfies the load profile 154 at minimal cost (e.g., schedule PGUs 120A-N to satisfy the net load requirements in accordance with cost characteristics of the respective PGUs 120A-N, as defined in the PGU metadata 156A-N).

Satisfying the discrete net load forecast quantities of the load profile 154 by use of a UC model (or other technique) may comprise configuring the power system 100 to satisfy constant and/or piecewise linear net load forecasts (e.g., hourly forecast quantities N(T)). Discrete and/or piecewise linear net load may not, however, adequately reflect inter-temporal variations in the net load during real-time operation of the power system 100; such inter-temporal variations may be due to, inter alia, generation and/or ramping trajectory characteristics of the PGUs 120A-N (which also may not be adequately modeled, as disclosed in further detail herein). Accordingly, a power system configuration 160 formulated to satisfy discrete and/or piecewise linear net load quantities may not accurately reflect real-time operation of the power system 100, which may reduce the ability of the power system 100 to respond to load fluctuations and/or render the power system 100 susceptible to scarcity events, such as ramping scarcity events as PGUs 120A-N are brought online in the power system 100.

The power system configuration 160 determined by the manager 146 may define "scheduled" capacity for the power system 100 during the operating period (e.g., a model of power system generation during the operating period, or PGM(t)). The scheduled capacity (PGM) may correspond to power generated by the selected PGUs 120A-N operating according to the configuration and/or schedule defined in the PGU configuration 162. In real-time operation, however, the power generated by the selected PGUs 120A-N may differ from the scheduled capacity (PGM(t)) due to, inter alia, inadequate modeling generation and/or ramping characteristics of the PGUs 120A-N.

Figure 2:
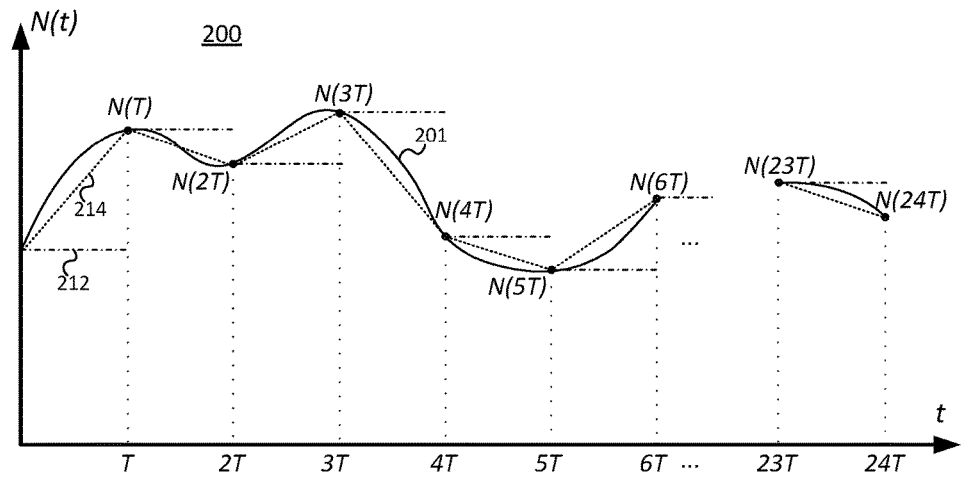
FIG. 2 depicts a plot illustrating net load forecast quantities, scheduled power generation, and real-time net load.

FIG. 2 is a plot depicting the real-time load on a power system 100, net load forecast quantities N(T), and "modeled" power generated by PGUs 120A-N (PGM(T)) in accordance with a power system configuration 160. Plot line 201 depicts a real-time load on the power system 100 during a 24-hour operating period. The real-time load 201 may be divided into a portion that was "scheduled" in accordance with the power system configuration 160 (PGM(t)), and a portion that needs to be supplied by other available resources due to shortfalls in the scheduled capacity (e.g., where real-time net load exceeds scheduled capacity). Deviation between the real-time load 201 and the "scheduled" load may be due to, inter alia, inaccuracies in the UC modeling and/or formulation techniques for determining the power system configuration 160. For example, the use of discrete net load values N(T) may not accurately reflect inter-temporal variations and/or fluctuations of the load in the power system 100 due to, inter alia, ramping events. Similarly, the model for the "scheduled" capacity provided by the PGUs 120A-N (PGM(t)) may differ from actual, real-time power generation due to, inter alia, inadequate modeling of the generation and/or ramping trajectory of the PGUs 120A-N. As used herein, the "generation trajectory" of a PGU 120A-N refers to characteristics of power generated by the PGU 120A-N as the PGU 120A-N transitions between different power generation states and/or levels (e.g., from generating no power for the power system 100 to generating a particular amount of power for the power system 100).

As disclosed above, the manager 146 may be configured to formulate the power system configuration 160 to satisfy discrete net-load forecast quantities, values, and/or samples N(T) as defined in a load profile 154 for the power system 100. FIG. 2 depicts a set of hourly net-load forecast values N(T . . . 24T). The PGU configuration 162 may comprise hourly decision variables for each PGU 120A-N, which may define the commitment status and generation schedule for the PGU 120A-N during each hour of operation (T). The PGU configuration 162 formulated by the manager 146 may, therefore, treat the PGUs 120A-N as being capable of instantly transitioning to the power generation levels specified for each interval; more specifically, for the purposes of formulating the power system configuration 160, the manager 146 may model the PGUs 120A-N as having a constant piecewise generation trajectory (PGM(t)). In FIG. 2, plot line 212 depicts an exemplary constant piecewise generation trajectory corresponding to the discrete net load values N(T)–N(24T). Although the manager 146 may configure the PGUs 120A-N to smoothly transition to different power levels (since instantaneous transitions may not be possible), such smoothing may be performed after formulation of the PGU configuration 162 and, as such, may not be reflected in the formulation of the power system configuration 160 itself. Alternatively, the manager 146 may formulate the power system configuration 160 such that the generation trajectory of the PGUs 120A-N is interpreted as being consistent with ramping constraints of the discrete net-load forecasts N(T . . . 24T) (e.g., the hourly intervals between respective net load forecast values). The generation trajectory of selected PGUs 120A-N (or PGM(t)) may, therefore, be viewed as following a linear trajectory from one hourly generation schedule to the next. In FIG. 2, a linear trajectory of scheduled capacity is depicted by plot line 214.

Figure 3:
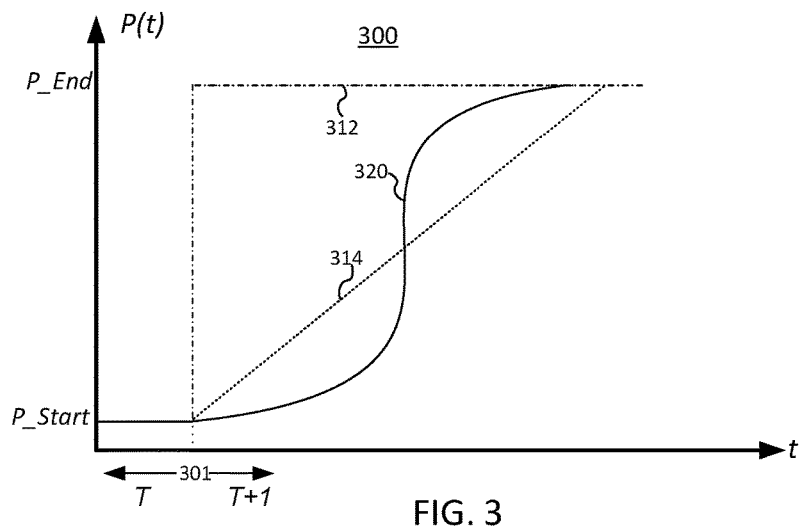
FIG. 3 is a plot depicting embodiments of generation trajectory models.

As illustrated in FIG. 2, the scheduled capacity corresponding to the power system configuration 160 formulated to satisfy discrete-time and/or piecewise linear net load, may not accurately model sub-interval variations in the net load (inter-hour variations) and/or may not accurately reflect generation trajectory characteristics of the PGUs 120A-N. FIG. 3 is a plot 300 depicting models for a generation trajectory of a PGU 120A-N. The plot 300 may correspond to a PGU configuration 162 in which a PGU 120A-N is scheduled to provide a particular amount of power during interval T (P_Start), and to transition to generating an increased amount of power (P_End) at the beginning of a next interval T+1 (301). As mentioned above, the manager 146 may schedule power from PGUs 120A-N as if the PGUs 120A-N are capable of transitioning from P_Start to P_End instantaneously, as depicted by plot line 312. Alternatively, the UC model may be interpreted as viewing the generation trajectory of the PGU 120A-N as a linear ramp, as depicted by plot line 314. The generation trajectories of discrete and/or piecewise linear UC models may not accurately reflect the generation trajectory 320 of the PGU 20A-N during real-time operation, as depicted by plot line 320. Therefore, the generation trajectory of the PGUs 120A-N "assumed" by the manager 146 may not reflect actual, real-time operation and, as such, the scheduled power generation may not satisfy net load on the power system 100 as expected (e.g., the power system 100 may be subject to ramping scarcity events as PGUs 120A-N ramp up power generation).

As disclosed above, configuring the power system 100 to satisfy discrete and/or linear net load forecasts (and inadequate consideration of actual generation trajectory characteristics of the PGUs 120A-N) may result in deviations between scheduled capacity and real-time load conditions, which may require the power system 100 to acquire additional capacity (at increased cost), decrease the availability of the power system 100 to respond to load fluctuations, render the power system susceptible to scarcity conditions, and/or result in ramping scarcity events.

Referring back to FIG. 1, in some embodiments, the power system configuration manager 146 is configured improve the power system configuration 160 (e.g., reduce deviation between scheduled capacity and real-time net load) by, inter alia, identifying and/or modeling inter-temporal variations in the net load forecast for the power system 100. More specifically, the manager 146 may be configured to determine an inter-temporal load profile 155 that models inter-temporal, inter-interval, and/or inter-sample variations in the net load forecast of the net load profile 154. As disclosed above, the load profile 154 may comprise a plurality of net load quantities, each net load quantity comprising a forecast of the net load at a particular time and/or during a particular time interval. The net load quantities may, therefore, comprise constant and/or linear net load forecasts at respective sample times and/or during respective time intervals. The manager 146 may formulate an inter-temporal load profile 155 to model inter-temporal variations between respective net load quantities (e.g., between respective sample times and/or intervals of respective net load quantities, such as inter-hour variation in an hourly day-ahead forecast).

In some embodiments, the manager 146 is configured to determine the inter-temporal load profile 155 by use of, inter alia, numerical techniques such as interpolation, function projection, expansion, and/or the like. In some embodiments, the manager 146 may determine the inter-temporal load profile 155 by expressing the net load samples in continuous-time and/or by use of higher-order function space (e.g., higher order than 1 per the constant and/or piecewise linear view of the net load quantities N(t), as disclosed above). The inter-temporal load profile 155 may comprise a polynomial, exponential, and/or other type of model of the net load quantities. In some embodiments, and as disclosed in further detail herein, the manager 146 may be configured to model the net load quantities as cubic splines, which may comprise projecting the net load quantities of the load profile 154 into a higher-order function space (e.g., Hermite function space). The inter-temporal load profile 155 may, therefore, comprise expanding a constant and/or piecewise linear sequence of net load quantities into a higher-order model of net load. The inter-temporal load profile 155 may be configured to reflect non-linear variations between respective sample periods and/or time intervals of the net load quantities (e.g., within respective time intervals of the load profile 154).

The manager 146 may be further configured to generate a power system configuration 160 adapted to satisfy the inter-temporal load profile 155, which may comprise selecting, scheduling, and/or configuring one or more PGUs 120A-N to satisfy inter-temporal variations in the net load as defined in the inter-temporal load profile 155 (e.g., variations within particular hours of a day-ahead load forecast). The manager 146 may be further configured to select, schedule, and/or configure PGUs 120A-N to satisfy non-linear variations in the net load.

As disclosed above, the PGU configuration 162 determined by the manager 146 may comprise a "scheduled" capacity for the power system 100. The scheduled capacity may correspond to a model of power generated by selected PGUs 120A-N according to the configuration and/or schedule of the PGU configuration 162. The PGUs 120A-N may be assumed to be capable of instantly transitioning (or making linear transitions) between different generation levels during different time intervals. These assumptions may not reflect generation and/or ramping characteristics of the PGUs 120A-N. The manager 146 may be configured to model continuous-time generation and/or ramping trajectory of the PGUs 120A-N, such that the PGUs 120A-N are not assumed to have an instantaneous or piecewise linear generation trajectory (e.g., per plot lines 212 and/or 214 of FIG. 2 and 312 and/or 314 of FIG. 3). The manager 146 may model the continuous-time generation and/or ramping characteristics of the PGUs 120A-N by monitoring the PGUs 120A-N (by use of monitoring devices 121A-N and/or PGU interface devices 115A-N, disclosed in further detail herein), based on properties and characteristics of the PGUs 120A-N, through testing and experience, and/or the like. The generation and/or ramping characteristics of the PGUs 120A-N may model a non-linear, continuous time generation and/or ramping trajectory of the PGUs 120A-N during real-time operation. The manager 146 may be further configured to maintain and/or record the generation and/or ramping characteristics of PGUs 120A-N in PGU generation/ramping (PGUGR) metadata 157A-N and to select, schedule, and/or configure PGUs 120A-N in the power system configuration 160 in accordance with the determined, inter-temporal, non-linear generation and/or ramping characteristics thereof. The manager 146 may be configured to model power generated by selected PGUs 120A-N (PGM (t)) in accordance with the generation and/or ramping trajectories of the PGUs 120A-N, as opposed to modeling the PGUs 120A-N as being capable of instantly transitioning to different power generation levels (and/or performing piecewise linear transitions).

In some embodiments, the manager 146 comprises a power system modeler 147 configured to a) determine the inter-temporal load profile 155 for the power system, and b) select, schedule, and/or configure PGUs 120A-N in the PGU configuration 162 to satisfy the inter-temporal load profile 155, in accordance with the continuous-time generation and/or ramping trajectories thereof (as defined in the PGUGR metadata 157A-N). The modeler 147 may be configured to interpolate, expand, and/or project the net load quantities of the load profile 154 into the inter-temporal load profile 155, as disclosed herein. The modeler 147 may be further configured to model the generation and/or ramping trajectory of the respective PGUs 120A-N, as disclosed herein. The modeler may formulate the inter-temporal load profile 155 and/or generation/ramping trajectories of the PGUs 120A-N as a UC model, and may determine an optimal solution to the model according to a particular criterion (e.g., objective function, such as a cost optimization function and/or the like). The optimal solution to the UC model may correspond to a particular selection, scheduling, and/or configuration of the PGUs 162 and/or infrastructure 164 for a power system configuration 160. The manager 146 may provide the power system configuration 160 to the power system controller 148 (controller 148), which may be configured to manage the real-time operation of the power system 100 accordingly.

As disclosed above, the controller 148 may be configured to manage real-time operation of the power system 100 in accordance with the power system configuration 160 determined by the manager 146. In some embodiments, the controller 148 may manage operation of the PGUs 120A-N by use of one or more PGU interface devices 115A-N. The PGU interface devices 115A-N may comprise MCCDs, as disclosed herein. The PGU interface devices 115A-N may comprise electrical hardware configured to selectively couple one or more PGU 120A-N to the power system infrastructure 110, such that electrical power produced thereby is available for transmission and/or distribution within the power system 100 (e.g., to the load 130). Accordingly, a PGU interface device 115A-N may comprise components of the transmission infrastructure 112 and/or distribution infrastructure 114, such as transmission lines, a transformer, a switch, a bus, a bus bar, a substation, a power conditioner, and/or the like. The controller 148 may be configured to selectively couple PGUs 120A-N to the transmission infrastructure 112 of the power system 100 by use of the PGU interface devices 115A-N.

The controller 148 may be adapted to configure the PGUs 120A-N to generate power for the power system in accordance with the PGU configuration 162 of the power system configuration 160. The controller 148 may be configured to transmit PGU requests 166 to the PGUs 120A-N through the power system communication infrastructure 118 and/or external communication infrastructure 102. The PGU requests 166 may be configured to select, schedule, and/or configure PGUs 120A-N to generate power for the power system 100 during real-time operation. Alternatively, or in addition, the controller 148 may interface with the PGUs 120A-N through one or more PGU interface devices 115A-N. In some embodiments, one or more of the PGU interface devices 115A-N may be communicatively coupled to respective PGUs 120A-N. The PGU interface devices 115A-N may convey PGU requests 166 (e.g., commitment, scheduling, and/or configuration information) to the PGUs 120A-N.

The controller 148 may be further configured to configure the infrastructure of the power system 100 in accordance with the power system configuration 160. The controller 148 may be configured to adapt the transmission infrastructure 112 to accept power from selected PGUs 120A-N in accordance with the PGU configuration 162, and may adapt the distribution infrastructure 114 to distribute the power to the load 130.

The controller 148 may configure the power system infrastructure 110 by use of one or more control devices 113A-N. The control devices 113A-N may be configured to control respective elements within the power system infrastructure 110, such as switches, buses, bus bars, relays, protective relays, transformers, and so on. The control devices 113A-N may be configured to control power flow within the power system infrastructure 110, which may comprise configuring the transmission infrastructure 112 to accept power being generated for the power system 100 by one or more of the PGUs 120A-N and to transfer the power into the distribution infrastructure 114, and configuring the distribution infrastructure 114 to distribute the electrical power transferred thereto to the load 130 (and/or particular load regions 130A-N), as disclosed herein.

One or more of the control devices 113A-N may comprise an MCCD, as disclosed herein. Accordingly, one or more of the control devices 113A-N may comprise processing resources, memory resources, non-transitory storage resources, HMI components, communication resources, and so on, as disclosed herein. FIG. 1 depicts only one of the control devices 113A-N, and omits the individual components thereof, to avoid obscuring the details of the depicted embodiments. One or more of the control devices 113A-N may be configured to monitor portions of the power system 100, as disclosed herein. Therefore, one or more of the control devices 113A-N and/or monitoring devices 111A-N may be embodied as the same device (e.g., a monitoring and control device, such that the control device 113A-N comprises the monitoring device 111A-N, and vice versa). Alternatively, or in addition, one or more of the control devices 113A-N may be embodied as a separate device from the monitor 142 and/or monitoring devices 111A-N, 121A-N, and/or 131A-N. The controller 148 may be configured to manage real-time operation of the power system infrastructure 110 in accordance with the infrastructure configuration 164. The controller 148 may be configured to adapt the power system infrastructure 110 to the infrastructure configuration 164 by use of the control devices 113A-N and, more specifically by formulating and transmitting power system configuration commands 168 (commands 168) to the control devices 113A-N. The commands 168 may be transmitted through an electronic communication network of the power system communication infrastructure 118, external communication infrastructure 102, and/or the like. The commands 168 may be adapted to configure the power system infrastructure 110 in accordance with the infrastructure configuration 164 (e.g., to accept and/or distribute power being generated by the PGUs 120A-N in accordance with the PGU configuration 162).

As disclosed above, the monitor 142 may be configured to monitor portions of the power system 100 during real-time operation. In some embodiments, the monitor 142 captures monitoring data pertaining to the PGUs 120A-N (by use of monitoring devices 121A-N and/or PGU interface devices 115A-N). The monitor 142 may provide PGU monitoring data to the modeler 147, which may compare power generated by the PGUs 120A-N (and/or the generation and ramping trajectories of the PGUs 120A-N) to the PGU metadata 156A-N and/or PGUGR 157A-N. The modeler 147 may be configured to refine characteristics, constraints, and/or properties of the PGUs 120A-N in accordance with the PGU monitoring data (e.g., to better reflect real-time operational characteristics of the PGUs 120A-N). The modeler 147 may be further configured to determine generation and/or ramping characteristics for the PGUs 120A-N (by use of the PGU monitoring data), and to refine the respective generation and/or ramping trajectories of the PGUs 120A-N accordingly.

Figure 4:
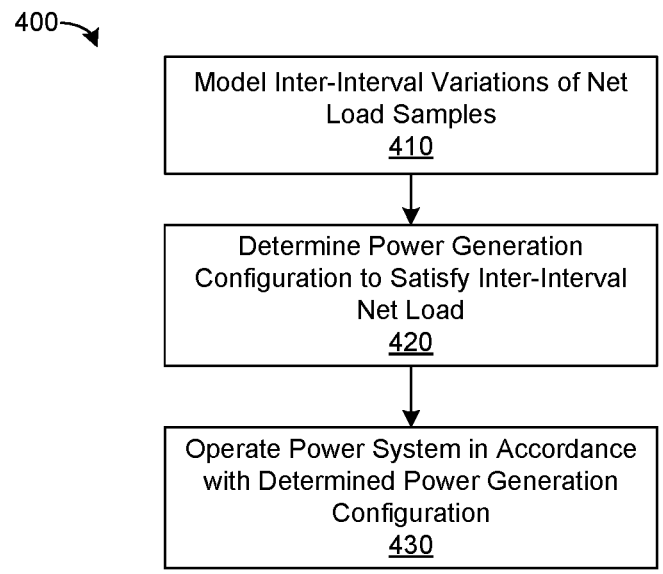
FIG. 4 is a flow diagram of one embodiment of a method for managing a power system.

FIG. 4 is a flow diagram of one embodiment of a method 400 for managing a power system 100. One or more of the steps of the method 400 (and/or the other methods disclosed herein) may be embodied as instructions stored on a non-transitory computer-readable storage medium. The instructions may be configured to cause a computing device, such as an MCCD and/or computing device 141, to perform the disclosed processing steps and/or operations. Alternatively, or in addition, one or more of the steps of the method 400 (and/or the other methods disclosed herein) may be embodied and/or implemented by hardware components, such as a circuit, monitoring device, control device, communication device, and/or the like. Step 410 may comprise determining an inter-interval and/or inter-temporal load profile 155 for the power system 100 during an operating period. The inter-temporal load profile 155 may be based on a load profile for the power system 100, which may comprise a plurality of net load quantities, each net load quantity forecasting a load on the power system 100 at a particular time and/or during a particular interval. Step 410 may comprise determining the load profile 154. Step 410 may comprise accessing monitoring data 152 pertaining to the power system 100 and/or acquiring monitoring data 152 by use of monitoring devices 111A-N, 121A-N, 131A-N, monitor 142, and/or the like. The monitoring data 152 may comprise a plurality of data samples and/or measurements. The data samples and/or measurements may correspond to a particular sample period (e.g., every N seconds, every hour, and/or the like). Step 410 may comprise determining net load quantities to forecast the net load on the power system 100 at respective times and/or during respective time intervals, as disclosed herein.

In some embodiments, step 410 comprises determining an inter-temporal load profile 155 corresponding to a sequence of net load samples (of the load profile 154), each net load sample defining a constant, linear, and/or piecewise linear net load on the power system during a respective time interval. Step 410 may comprise modeling variances to the net load within one or more of the time intervals. Step 410 may comprise modeling non-linear variances in the net load, as disclosed above. In some embodiments, step 410 may comprise modeling, expanding, and/or projecting the samples into a higher-order function space (e.g., cubic splines). In some embodiments, step 410 comprises projecting the net load quantities into a cubic Hermite function space.

Step 420 may comprise determining a PGU configuration 162 for the power system 100. Step 420 may comprise determining the PGU configuration 162 to select, configure, and/or schedule PGUs 120A-N to generate power for the power system 100 during the operating period. The PGU configuration 162 may be adapted to select, configure and/or schedule PGUs 120A-N to satisfy the net load forecast for the power system 100, which may comprise selecting, configuring, and/or scheduling PGUs 120A-N to satisfy the inter-temporal variations of the net load modeled at step 410.

Step 430 may comprise managing real-time operation of the power system 100 in accordance with the PGU configuration 162 of step 420. Step 430 may comprise issuing PGU requests 166 to one or more of the PGUs 120A-N to commit (e.g., schedule) power generation. The PGU requests 166 may further specify an operating configuration of the PGUs 120A-N, such as generation characteristics (e.g., how much power to generate at particular times), ramping characteristics (e.g., how fast to ramp up power generation), and so on. Step 430 may further comprise configuring the power system infrastructure 110 in accordance with infrastructure configuration 164, as disclosed herein (e.g., by generating and/or issuing power system configuration commands 168 to respective control devices 113A-N deployed within the power system infrastructure 110).

Figure 5:
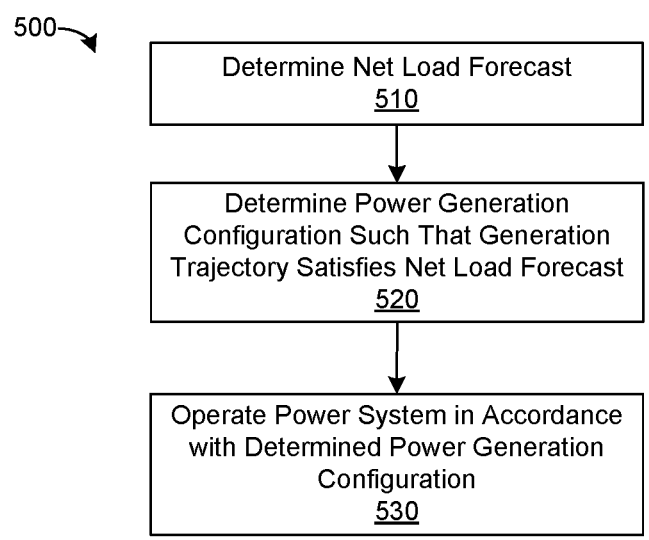
FIG. 5 is a flow diagram of another embodiment of a method for managing a power system.

FIG. 5 is a flow diagram of another embodiment of a method 500 for managing a power system. Step 510 may comprise determining a load profile 154 for the power system 100 as disclosed herein. The load profile 154 may comprise a sequence of net load quantities, each forecasting a load on the power system 100 at a particular time and/or during a particular time interval. Step 510 may comprise determining and/or modeling inter-interval variance in the load profile, as disclosed herein. The inter-interval variances may comprise non-linear variations of the net load between respective net load quantities.

Step 520 may comprise determining a PGU configuration 162 to satisfy the determined load profile 154 for the power system. Step 520 may comprise selecting, scheduling, and/or configuring PGUs 120A-N during the operating period. Step 520 may comprise accessing generation and/or ramping characteristics of the PGUs 120A-N (PGUGR metadata 157A-N), which may define continuous-time and/or non-linear generation and/or ramping characteristics of the PGUs 120A-N. Step 520 may comprise selecting, scheduling, and/or configuring the PGUs 120 to generate power for the power system 100 in accordance with the generation and/or ramping characteristics thereof.

Step 530 may comprise managing real-time operation of the power system 100 in accordance with the PGU configuration 162 of step 520. As disclosed herein, step 530 may comprise issuing PGU requests 166 to one or more of the PGUs 120A-N to commit (e.g., schedule) power generation, issuing commands 168 to configure the power system infrastructure 110, and so on.

Figure 6:
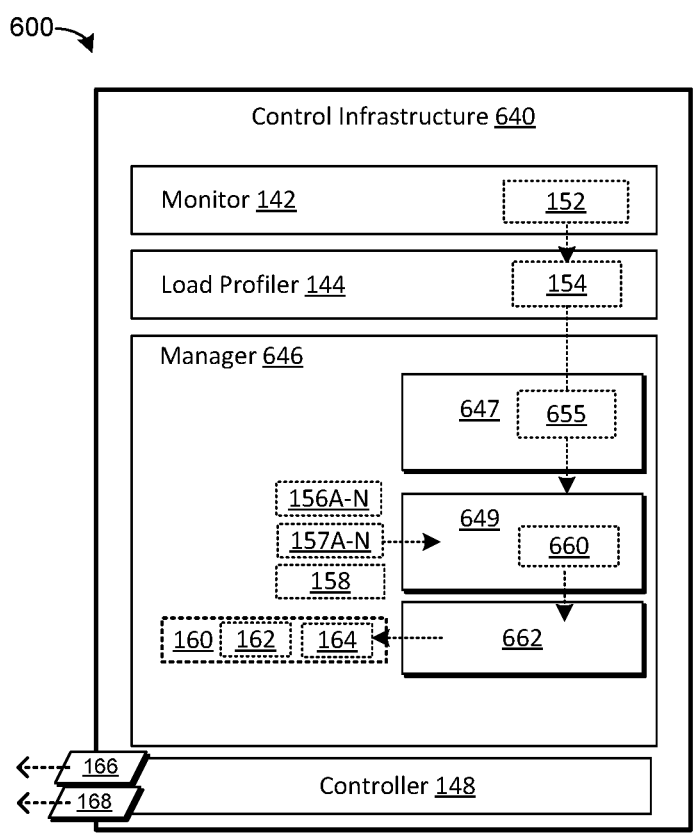
FIG. 6 is a schematic block diagram of one embodiment of an apparatus for managing a power system.

FIG. 6 is a schematic block diagram of one embodiment of control infrastructure 640 of the power system 100. FIG. 6 omits certain components of the power system 100 to avoid obscuring the details of the illustrated embodiments. The control infrastructure 640 may comprise and/or be embodied on an MCCD 601, which, as disclosed herein, may comprise processing resources 602, memory resources 603, non-transitory storage resources 604, communication resources 605, HMI components 606, and/the like. The control infrastructure 640 may comprise a monitor 142, load profiler 144, power system configuration manager 646, and operating controller 148. The monitor 142 may be configured to acquire monitoring data 152 pertaining to the power system by use of, inter alia, monitoring devices, such as the monitoring devices 111A-N, 121A-N, and/or 131A-N, disclosed herein.

The load profiler 144 may be configured to determine a load profile 154 for the power system 100. The load profile 154 may comprise a forecast of the net load on the power system 100 during a particular operating period (e.g., a day-ahead forecast). The load profile 154 may comprise a plurality of net load quantities, each corresponding to a net load forecast for the power system at a particular time and/or during a particular interval. The net load quantities may correspond to power consumption measurement data captured at particular sampling and/or measurement intervals. The load profiler 144 may derive the load profile 154 (and/or the sample points thereof) from power consumption monitoring data and/or other factors, as disclosed herein.

The power system configuration manager 646 (or manager 646) may be configured to determine a power system configuration 660. The power system configuration 160 may comprise a PGU configuration 162 and infrastructure configuration 164, as disclosed herein. The PGU configuration 162 may select, schedule, and/or configure PGUs 120A-N to generate power during an operating period. The infrastructure configuration 164 may be adapted to configure the power system infrastructure 110 to distribute power generated by the selected PGUs 120A-N to the load 130 (and/or particular load regions 130A-N). The operating controller 148 may be configured to manage real-time operation of the power system 100 in accordance with the determined power system configuration 660, as disclosed herein.

In the FIG. 6 embodiment, the manager 646 may be configured model inter-temporal variations in the load profile 154 and/or model generation and/or ramping trajectory of respective PGUs 120A-N (by use of PGUGR metadata 157A-N). The manager 646 may be further configured to formulate the PGU configuration 662 in accordance with the inter-temporal net load profile 656 and/or generation/ramping trajectories of the PGUs 120A-N.

As disclosed above, approaches to scheduling PGUs on an hourly basis (and in accordance with an hourly net load forecast) may be interpreted as a linear approximation of net load and/or generation trajectory, which may not accurately reflect real-time operations of the power system 100, leading to inaccuracies (and susceptibility to ramping scarcity conditions). The day-ahead UC formulation for scheduling generation resources may be expressed as a continuous-time optimization system, as follows:

$$\min \int_\Omega C(G(t), I(t)) dt$$

$$s.t.\ f(G(t), I(t)) = 0$$

$$h(G(t), G'(t), I(t)) \le 0 \quad \text{Eq. 1}$$

In Eq. 1, C may comprise a cost function, G(t) models power generation of selected PGUs 120A-N as a function of time (e.g., generation trajectory), G'(t) may comprise the time derivative of G(t) (e.g., ramping trajectory), I(t) represents commitment variables for respective PGUs 120A-N (decision variables), and $\Omega$ represents the operating period (e.g., scheduling horizon, such as a day-ahead). Solving the UC formulation of Eq. 1 may comprise determining an hourly commitment scheme that minimizes total generation cost during the operating period $\Omega$. The functions $f$ and $h$ may comprise UC equality and inequality constraints, including, but not limited to: a balance constraint, PGU generation capacity, ramping, minimum on/off time, startup and shutdown costs, and so on. The functions $f$ and $h$ may, therefore, be defined by the PGU metadata 156A-N and/or infrastructure metadata 158, as disclosed herein. In some discrete-time UC techniques, commitment variables I(t) may be limited to hourly changes of commitment status. The generation trajectory G(t), however, may be adapted to change between consecutive hourly schedules. As illustrated below, the solution to the hourly day-ahead schedule of Eq. (1) lies in a linear function space. Since all polynomial splines of the same order are equivalent (e.g., span the same sub-space), the generation schedule, constraints, and cost function of Eq. 1 may be interpreted as polynomials (e.g., interpreted in terms of shifts of Bernstein polynomials of degree 1).

Bernstein polynomials of degree n may be defined as:

$$B_{k,n}(t) = \binom{n}{k} t^k (1-t)^{n-k} \Pi(t),\ k \in [0, n],\ t \in [0, 1]. \quad \text{Eq. 2}$$

In Eq. 2 k refers to a kth PGU 120A-N, m refers to a particular interval (e.g., hour), and n refers to a segment of a linearized cost function. Referring back to FIG. 2, the linear spline approximation of the discrete net load forecast points N(T)–N(24T) may be expressed in each hourly sub-interval m in the function space of two Bernstein polynomials of degree 1. More particularly, as $B_{0,1}(t)$=t and $B_{1,1}(t)$=1−t, weighted by the value of load at the beginning and end of the hour, as follows:

$$\hat{N}(t) = N_m^{B0} B_{0,1}(t) + N_m^{B1} B_{1,1}(t)\ t_m \le t < t_{m+1} \quad \text{Eq. 3}$$

In Eq. 3, $N_m^{B0} = N(t_m)$ and $N_m^{B1} = N(t_{m+1})$ may comprise the coefficients of the net load forecast in the linear function space, defining the vectors:

$$B_1(t) = (B_{0,1}(t); B_{1,1}(t))^T,\ N_m = (N_m^{B0}, N_m^{B1})^T, \quad \text{Eq. 4}$$

The linear expansion of Eq. 3 may be expressed in matrix form over the day-ahead scheduling horizon $\Omega$ as follows:

$$\hat{N}(t) = \sum_{m=0}^{M-1} B_1^T(\tau_m) N_m. \quad \text{Eq. 5}$$

In Eq. 5, the term $\tau_m = (t-t_m)/(t_{m+1}-t_m)$ translates and rescales $B_1(t)$ to cover respective periods $t_m \le t \le t_{+1}$. The continuous-tie load model of Eq. 5 may, therefore, represent the piecewise linear load profile depicted by line 214 in FIG. 2 in the 2M-dimensional function space of the Bernstein polynomials of degree 1.

The continuous time generation trajectory corresponding to the discrete-time schedule of generating units (e.g., PGU configuration 162 comprising hourly scheduling of PGUs 120A-N) may also be an element of the same 2M-dimensional function space spanned by M=24 shifts of the Bernstein polynomials of degree 1, as follows:

$$G_k(t) = \sum_{m=0}^{M-1} B_1^T(\tau_m) G_{k,m}. \quad \text{Eq. 6}$$

In Eq. 6, $G_{k,m} = (G_{k,m}^{B0}, G_{k,m}^{B0})^T$ represents the coefficients of the continuous-time generation trajectory of generating unit k at hourly interval m. The coefficients of the expansion equal to the hourly generation schedules may be expressed as:

$$G_{k,m}^{B0} = G_k(t_m),\ G_{k,m}^{B1} = G_k(t_{m+1}). \quad \text{Eq. 7}$$

Although the continuous-time generation schedule lies in the 2M-dimensional function space, the number of degrees of freedom is M, due to generation continuity at the intersection of hourly intervals, per Eq. 8 below:

$$G_{k,m-1}^{B1} = G_{k,m}^{B0} = G_k(t_m),\ \forall m > 1. \quad \text{Eq. 8}$$

The quadratic cost function of generating units may be approximated by a piecewise linear cost function, which may be configured to preserve the linearity of the UC formulation of Eq. 4:

$$C_k(G_k(t), I_k(t)) = C_k(G_k^{min}) I_k(t) + \sum_{n=0}^{N_k-1} \gamma_{k,n}(t) \Gamma_{k,n}(t). \quad \text{Eq. 9}$$

In Eq. 9, the capacity range of generating unit k is divided into $N_k$ sections using intermediate generation points $g_0 = G_k^{min}$, $g_1$, $g_2$ ... $g_{Nk} = G_k^{max}$, and $N_k$ number of auxiliary generation variables $\Gamma_{k,n}(t)$ are defined to model the generation schedule in each of the linear sections. The total generation of generating unit k may, therefore, be stated in terms of the auxiliary generation variables $\Gamma_{k,n}(t)$, as follows:

$$G_k(t) = G_k^{min} I_k(t) + \sum_{n=0}^{N_k-1} \Gamma_{k,n}(t). \qquad \text{Eq. 10}$$

$$0 \leq \Gamma_{k,n}(t) \leq g_{n+1} - g_n. \qquad \text{Eq. 11}$$

The auxiliary generation variables $\Gamma_{k,n}(t)$ may also be expressed in the 2M-dimensional function space spanned by $\{\{B_1^T(\tau_m)\}_{m=0}^{M-1}\}$, as follows:

$$\Gamma_{k,n}(t) = \sum_{m=0}^{M-1} B_1^T(\tau_m) \Gamma_{k,n,m}. \qquad \text{Eq. 12}$$

The continuous-time relation in Eq. 10 may be equivalent to the following constraint on the coefficients:

$$G_{k,m} = G_k^{min} I_{k,m} + \sum_{n=0}^{N_k-1} \Gamma_{k,n,m}. \qquad \text{Eq. 13}$$

In Eq. 13, $I_{k,m} = (I_k(t_m), I_k(t_{m+1}))^T$, and $G_k^{min}$ may comprise the minimum generation capacity of generating unit k. The cost function coefficients in Eq. 9 are assumed to be constant over each period (hour), such that:

$$\gamma_{k,n}(t) \approx \gamma_{k,n}(t_m) \quad t_m \leq t < t_{m+1}, \qquad \text{Eq. 14}$$

This assumption may accurately reflect an hourly market environment in which power generation resources are committed, priced, and/or scheduled according to hourly intervals. The total generation cost of generating unit k over the day-ahead scheduling horizon $\Omega$ may, therefore, be calculated using the function space representation the auxiliary generation variables $\Gamma_{k,n}(t)$ of Eq. 12, as follows:

$$\int_\Omega C_k(G_k(t), I_k(t)) dt = \qquad \text{Eq. 15}$$
$$\sum_{m=0}^{M-1} \left[ C_k(G_k^{min}) I_k(t_m) + \sum_{n=0}^{N_k-1} \gamma_{k,n}(t_m) \Gamma_{k,n}(t_m) \right].$$

As described above, the linear approximation of net load and/or generation trajectory of Eq. 1-15 may not accurately mode sub-hourly variations in net load, nor consider non-linear generation and/or ramping trajectories of the PGUs 120A-N. Therefore, in some embodiments, the manager 646 may be configured to formulate the net load projection and/or generation trajectory within a higher-order, non-linear function space. Accordingly, the net load forecast of the load profile 154 and/or generation trajectory (e.g., the scheduled capacity) may be may be expressed as cubic splines. Cubic splines may interpolate points with minimum curvature while providing additional flexibility to fit continuous-time load variations (which are not reflected in hourly net load and/or generation systems).

In some embodiments, the manager 646 may comprise a net load modeler 645 configured to determine a cubic spline representation of the net load (CSRNL 655). As disclosed in further detail herein, the CSNRL 655 may comprise a projection in cubic Hermite function space. The manager 646 may further comprise a UC modeler 649 to formulate a UC model 660 for the power system (and CSNRL 665), and a UC processor 662 to determine an optimal solution to the UC model (which may correspond to a power system configuration 160 for the power system 100).

The manager 646 may be configured to project the net load and/or generation trajectory by use of a Hermite basis and/or Bernstein polynomials of degree 3 (by use of the net load modeler 645). The Hermite basis may enable coefficients of the expansion to be defined as samples of generation and generation rate of change (e.g., ramp). Bernstein polynomials may be useful as a proxy expansion to enforce capacity and ramping constraints for continuous-time generation trajectory. Although particular implementations for projecting the net load and/or generation trajectory into a cubic spline function space are described herein, the disclosure is not limited in this regard and could be adapted to utilize any non-linear and/or higher-order model for net load and/or generation trajectory.

The manager 146 may be configured to determine a continuous-time representation of the net load in the cubic spline function space. As disclosed above, the load profile 154 may comprise a sequence of sample points (net load projections) which may be distributed into M intervals within the scheduling horizon $\Omega$ (e.g., the next 24-hours of operation). The net load projections of the load profile 154 may comprise points $0, t_1, t_2, \ldots t_M$. The Hermite polynomial basis in t [0, 1) are:

$$H_{00}(t) = (2t^3 - 3t^2 + 1)\Pi(t)$$

$$H_{01}(t) = (t^3 - 2t^2 + t)\Pi(t)$$

$$H_{10}(t) = (-2t^3 - 3t^2)\Pi(t)$$

$$H_{11}(t) = (t^3 - t^2)\Pi(t)$$

The Hermite polynomial basis may comprise entries of the vector $H(t) = (H_{00}(t), H_{01}(t), H_{10}(t), H_{11}(t))^T$. The coefficients of the cubic Hermite approximation of load over the mth interval may be denoted as the vector $N_m^H = (N_m^{00}, N_m^{01}, N_m^{10}, N_m^{11})^T$, and the Hermite approximation of the day-ahead load profile may be expressed as:

$$\hat{N}(t) = \sum_{m=0}^{M-1} H^T(\tau_m) N_m^H. \qquad \text{Eq. 16}$$

The manager 146 may configure Eq. 16 such that the coefficients of the cubic Hermite approximation of the net load are uniquely defined by the value of load and the load derivate (e.g., ramp) at the starting and ending point of respective intervals, in accordance with Eqs. 17 and 18 below:

$$N_m^{00} = \hat{N}(t_m), N_m^{10} = \hat{N}(t_{m+1}), \qquad \text{Eq. 17.}$$

$$N_m^{01} = \hat{N}'(t_m), N_m^{11} = \hat{N}'(t_{m+1}). \qquad \text{Eq. 18.}$$

As illustrated above, the linear spline expansion only ensured continuity of the net load, but not of its derivative. The $C^1$ continuity constraint of Eq. 19 (below) may be imposed on the cubic Hermite approximation of the net load (Eq. 18) to ensure continuity of its derivative:

$$N_m^{00}=N_{m-1}^{10}, N_m^{01}=N_{m-1}^{11} \quad \forall m>0 \qquad \text{Eq. 19.}$$

The constraint of Eq. 19 implies that there are 2M parameters defining $\hat{N}(t)$ in the function space of cubic Hermite splines. The cubic Hermite basis functions may be expressed in terms of Bernstein polynomials of degree 3 as follows:

$$H(t)=WB_3(t) \qquad \text{Eq. 20.}$$

The change of basis matrix W may be defined as:

$$W = \begin{pmatrix} 1 & 1 & 0 & 0 \\ 0 & \frac{1}{3} & 0 & 0 \\ 0 & 0 & 1 & 1 \\ 0 & 0 & -\frac{1}{3} & 0 \end{pmatrix}. \qquad \text{Eq. 21}$$

Using Eq. 20, $\hat{N}(t)$ of Eq. 16 may be expressed in terms of Bernstein polynomials of degree 3 as:

$$\hat{N}(t) = \sum_{m=0}^{M-1} B_3^T(\tau_m) W^T N_m^H = \sum_{m=0}^{M-1} B_3^T(\tau_m) N_m^B. \qquad \text{Eq. 22}$$

In Eq. 22, $N_m^B = W^T N_m^H$ may comprise a vector of the coefficients for Bernstein polynomial approximation of the net load in the mth interval. Correspondingly, the continuous-time generation trajectory of PGUs 120A-N over the day-ahead scheduling horizon $\Omega$ may be expressed as:

$$G_k(t) = \sum_{m=0}^{M-1} H^T(\tau_m) G_{k,m}^H = \sum_{m=0}^{M-1} B_3^T(\tau_m) G_{k,m}^B. \qquad \text{Eq. 23}$$

As shown in Eq. 23, the cubic Hermite spline and the Bernstein polynomial of degree 3 comprise two interchangeable basis for modeling generation trajectory (and/or net load) and, as such, may be used interchangeably in order to, inter alia, enforce different constraints and/or conditions. The continuity property C1 may ensure that only the first two cubic Hermit coefficients (i.e., $G_{k,m}^{00}$ and $G_{k,m}^{01}$) are independent in each interval. These coefficients may represent the value of the generation and ramping of a PGU 120A-N at the beginning point of the interval at time $t_m$. The two coefficients (i.e., $G_{k,m}^{10}$ and $G_{k,m}^{11}$) in each interval are not independent and may be respectively equal to the values of the generation and ramping of the PGU at the beginning point of the subsequent interval ($t_{m+1}$).

As mentioned above, the disclosure is not limited to modeling inter-interval variations of net load and/or generation trajectory by use of Hermite splines and/or Bernstein polynomials. However, the use of Bernstein polynomials of degree 3 may provide several advantages. For instance, derivatives of the Bernstein polynomials of degree n may be expressed as the degree of the polynomial, multiplied by the difference of two Bernstein polynomials of degree n−1. For degree 3, a derivative may be expressed as:

$$B'_{k,3}(t)=3(B_{k-1,2}(t)-B_{k,2}(t)) \qquad \text{Eq. 24.}$$

Eq. 24 may be expressed in matrix form as follows:

$$B'_3(t)=KB_2(t) \qquad \text{Eq. 25.}$$

$B_2(t)$ may comprise the vector of Bernstein polynomials of degree 2, and K may comprise a linear matrix relating the derivatives of $B_3(t)$ with $B_2(t)$, as follows:

$$K = \begin{pmatrix} -3 & 0 & 0 \\ 3 & -3 & 0 \\ 0 & 3 & -3 \\ 0 & 0 & 3 \end{pmatrix} \qquad \text{Eq. 26}$$

The continuous-time ramping trajectory of a PGU 120A-N k may be defined in a space spanned by Bernstein polynomials of degree 2 as follows:

$$G'_k(t) = \sum_{m=0}^{M-1} B_2^T(\tau_m) G'^B_{k,m}. \qquad \text{Eq. 27}$$

In Eq. 27, $G'^B_{k,m} = (G'^{B0}_{k,m}, G'^{B1}_{k,m}, G'^{B2}_{k,m})^T$ may represent the vector of Bernstein coefficients of the continuous-time ramping trajectory, which can be expressed in terms of cubic Hermite splines as follows:

$$G'^B_{k,m} = K^T G^B_{k,m} = K^T W^T G^H_{k,m} \qquad \text{Eq. 28.}$$

In which:

$$G'^{B0}_{k,m} = 3(G^{B1}_{k,m} - G^{B0}_{k,m}) = G^{01}_{k,m} \qquad \text{Eq. 29.}$$

$$G'^{B1}_{k,m} = 3(G^{B2}_{k,m} - G^{B1}_{k,m}) = 3(G^{10}_{k,m} - G^{00}_{k,m}) - G^{11}_{k,m} - G^{01}_{k,m} \qquad \text{Eq. 30.}$$

$$G'^{B2}_{k,m} = 3(G^{B3}_{k,m} - G^{B2}_{k,m}) = G^{11}_{k,m}. \qquad \text{Eq. 31.}$$

Bernstein polynomials may also satisfy a "convex hull property," such that the continuous-time trajectories will remain within a convex hull formed by four Bernstein points. Accordingly, the lower and upper bounds of the continuous-time generation and ramping trajectories of PGUs 120A-N (defined in PGUGR metadata 157A-N) within an internal m may be represented by the associated Bernstein coefficients, as follows:

$$\min_{t_m \leq t \leq t_{m+1}} \{B_3^T(\tau_m) G^B_{k,m}\} \geq \min\{G^B_{k,m}\}. \qquad \text{Eq. 32}$$

$$\max_{t_m \leq t \leq t_{m+1}} \{B_3^T(\tau_m) G^B_{k,m}\} \leq \max\{G^B_{k,m}\}. \qquad \text{Eq. 33}$$

$$\min_{t_m \leq t \leq t_{m+1}} \{B_2^T(\tau_m) G'^B_{k,m}\} \geq \min\{G'^B_{k,m}\}. \qquad \text{Eq. 34}$$

$$\max_{t_m \leq t \leq t_{m+1}} \{B_2^T(\tau_m) G'^B_{k,m}\} \leq \max\{G'^B_{k,m}\}. \qquad \text{Eq. 35}$$

Another advantage of the continuous-time model of generation trajectory using cubic Hermite and Bernstein polynomials as disclosed herein (e.g., per Eq. 23) is a corresponding generation cost function (e.g., Eq. 9) may be accurately computed for continuous-time generation trajectory, as opposed to an hourly constant generation schedule. The auxiliary generation variables $\Gamma_{k,n}(t)$ of the linearized cost function of Eq. 9 may be translated into the cubic Hermite function space, as follows:

$$\Gamma_{k,n}(t) = \sum_{m=0}^{M-1} H^T(\tau_m)\Gamma_{k,n,m}^H.$$  Eq. 36

In Eq. 36, $\Gamma_{k,n,m}$ may comprise a vector of cubic Hermite coefficients, as follows:

$$\Gamma_{k,n,m}^H = (\Gamma_{k,n,m}^{00}, \Gamma_{k,n,m}^{01}, \Gamma_{k,n,m}^{10}, \Gamma_{k,n,m}^{11})^T.$$  Eq. 37

In the FIG. 6 embodiment, the net load modeler 647 may be configured to express the net load profile 154 as cubic Hermite polynomials, CSRNL 655 (e.g., in accordance with Eq. 16). The respective coefficients $B_m^H$ of the may flow into a UC modeler 649, which may generate a UC model 660 for the power system 100. The continuous-time generation and ramping trajectories of each PGU 120A-N k may be represented by the coefficients $G'^H_{k,m}, G'^B_{k,m}$ defined over M intervals (e.g., hours) of the scheduling horizon Ω (e.g., day). The continuous-time binary commitment variable (decision variable) of a particular PGU 120A-N k, $I_k(t)$ may be constant in each interval m, and as such, the continuous-time piecewise constant representation of the commitment variable k may be expressed as:

$$I_k(t) = \sum_{m=0}^{M-1} I_k(t_m)[u(t - t_m) - u(t - t_{m+1})].$$  Eq. 38

The coefficients $G'^H_{k,m}, G'^B_{k,m}$ and binary variables $I_k(t_m)$ may act as the decision variables of the UC model 660. The optimal solution to the UC model 660 may be utilized to reconstruct the continuous-time generation and ramping trajectories of the PGUs 120A-N (e.g., power generation module, PGM(t) for the power system 100, as disclosed herein).

The manager 646 comprise a UC processor 662 configured to determine an "optimal" power system configuration 160 by, inter alia, determining an optimal solution to the UC model 660, as disclosed herein. The optimal solution to the UC model 660 may correspond to an optimization criterion, such as minimizing the total continuous-time generation cost of power generated during the scheduling horizon Ω (e.g., day), including startup and shutdown costs. The continuous-time generation cost function may be defined in terms of the cubic Hermite coefficients of the auxiliary generation variables $\Gamma_{k,n,m}(t)$, by integrating the linearized cost function of Eq. 9, as follows:

$$\int_\Omega \hat{C}_k(G_k(t), I_k(t))dt = \sum_{m=0}^{M-1}\left[C_k(G_k^{min})\int_{t_m}^{t_{m+1}} I_k(t)dt + \sum_{n=0}^{N_k-1}\gamma_{k,n}(t_m)(\Gamma_{k,n,m}^H)^T\left[\int_{t_m}^{t_{m+1}} H(\tau_m)dt\right]\right].$$  Eq. 39

In Eq. 39, the cost coefficients $C_k(G_k^{min})$ and $\gamma_{k,n}(t_m)$ may be constant over each interval m. By calculating the integrals per Eq. 39, the objective function of the UC model 660, including the total generation, startup, and shutdown costs, may be expressed as follows:

$$\min \sum_{k=1}^{K}\sum_{M=0}^{M-1}\left[C_k^{SU}(t_m) + C_k^{SD}(t_m) + T_m\left(C_k(G_k^{min})I_k(t_m) + \sum_{n=0}^{N_k-1}\gamma_{k,n}(t_m)\left[\frac{\Gamma_{k,n,m}^{00}+\Gamma_{k,n,m}^{10}}{2} + \frac{\Gamma_{k,n,m}^{01}-\Gamma_{k,n,m}^{11}}{12}\right]\right)\right].$$  Eq. 40

The startup and shutdown costs of a PGU 120A-N (per Eq. 40) may be triggered when PGUs 120A-N are committed (scheduled) or shutdown, which are respectively identified by the corresponding changes to the binary commitment variable in Eqs. 41 and 42 below. In addition, the bounds of the auxiliary generation variables of Eq. 11 may be translated into constraints on the associated Bernstein coefficients due to, inter alia, the convex hull property of Bernstein polynomials, as disclosed above.

$$\gamma_k^{SU}[I_k(t_m) - I_k(t_{m-1})] \leq C_k^{SU}(t_m) \quad \forall k, \forall m$$  Eq. 41

$$\gamma_k^{SD}[I_k(t_{m-1}) - I_k(t_m)] \leq C_k^{SD}(t_m) \quad \forall k, \forall m$$  Eq. 42

$$0 \leq W^T\Gamma_{k,n,m}^H \leq g_{n+1} - g_n \quad \forall n, \forall k, \forall m.$$  Eq. 43

The UC processor 662 may be configured to balance generation and load (in the UC model 660) per Eq. 44 below, which may comprise balancing the four cubic Hermite coefficients of the continuous-time load and generation trajectory in each interval m. Therefore, unlike discrete and/or piecewise linear PGU management in which PGUs 120A-N are scheduled to balance hourly samples of net load, the manager 646 is configured to schedule the continuous-time generation trajectory (per Eq. 44) to balance the continuous-time variations and ramping of load within the intervals m, as represented by the cubic Hermite spline model. In addition, the UC processor 662 may enforce the constraints of Eq. 45 (below) to assure e continuity of the generation trajectory over the scheduling horizon Ω. In Eq. 46 (below), the Bernstein coefficient of the continuous-time generation trajectory of generating units are expressed in terms of the coefficients of the auxiliary generation variables, where $I_{k,m} = (I_k(t_m), I_k(t_{m+1}), I_k(t_{m+1}))^T$ is the vector of applicable binary variables. In Eq. 46, the first two cubic Hermite coefficients of generation variables may be associated with the commitment status of PGUs 120A-N in interval m, while the last two coefficients are associated with the commitment status of PGUs 120A-N in interval m+1.

$$\sum_{k=1}^{K} G_{k,m}^H = N_m^H \quad \forall m.$$  Eq. 44

$$G_{k,m}^{10} = G_{k,m+1}^{00}, G_{k,m}^{11} = G_{k,m+1}^{01} \quad \forall k, \forall m.$$  Eq. 45

$$W^T G_{k,m}^H = G_k^{min}I_{k,m} + \sum_{n=0}^{N_k-1} W^T\Gamma_{k,n,m}^H.$$  Eq. 46

The UC processor 662 may leverage the convex hull property of Bernstein polynomials to enforce generation capacity constrains in continuous-time by capping the four Bernstein coefficients of the generation trajectory as follows:

$$W^T G_{k,m}^H \geq G_k^{min}I_{k,m} \quad \forall k, \forall m$$  Eq. 47

$$W^T G_{k,m}^H \leq G_k^{max}I_{k,m} \quad \forall k, \forall m.$$  Eq. 48

The UC processor 660 may be configured to apply continuous-time ramping constraints in a similar manner by capping the Bernstein coefficients of the continuous-time ramping trajectory of PGUs 120A-N derived in Eqs. 29-31, only two of which are independent in each interval m due to the ramping continuity constraint of Eq. 45. The ramping up and down constraints for the first Bernstein coefficient of generation ramping trajectory (which may also account for the startup and shutdown ramp rates) may be defined as:

$$G'^{B0}_{k,m} \leq R_k^U I_k(t_{m-1}) + R_k^{SU}[I_k(t_m) - I_k(t_{m-1})] + G_k^{max}[1 - I_k(t_m)] \quad \forall k, \forall m \quad \text{Eq. 49}$$

$$-G'^{B0}_{k,m} \leq R_k^D I_k(t_m) + R_k^{SD}[I_k(t_{m-1}) - I_k(t_m)] + G_k^{max}[1 - I_k(t_{m-1})] \quad \forall k, \forall m \quad \text{Eq. 50}$$

In Eqs. 49 and 50, $R_k^U$, $R_k^D$, $R_k^{SU}$, $R_k^{SD}$ may represent ramp up, ramp down, startup ramp, and shutdown ramp limits of a PGU 120A-N k. The ramping up and down constraints for the second Bernstein coefficient of generation ramping trajectory may be defined as:

$$G'^{B1}_{k,m} \leq R_k^U I_k(t_m) \, \forall k, \forall m = 0 \ldots M-2 \, -G'^{B1}_{k,m} \leq R_k^D I_k(t_m) + \eta[1 - I_k(t_{m+1})] \quad \text{Eq. 51}$$

$$\forall k, \forall m = 0 \ldots M-2 \quad \text{Eq. 52}$$

In Eqs. 51 and 52, η may be a constant equal to the upper bound of $G'^{B1}_{k,m}$ in interval m when the PGU 120A-N k is offline in interval m+1. The second term of Eq. 52 may assure that the constraint does not prevent the PGU 120A-N from turning off.

The UC processor 662 may be further configured to formulate minimum off time constraints for the UC model 660, as follows:

$$\sum_{m'=m}^{m+T_k^{on}-1} T_{m'} I_k(t_{m'}) \geq T_k^{on}[I_k(t_m) - I_k(t_{m-1})]. \quad \text{Eq. 53}$$

$$\sum_{m'=m}^{m+T_k^{off}-1} T_{m'}[1 - I_k(t_{m'})] \geq T_k^{off}[I_k(t_{m-1}) - I_k(t_m)]. \quad \text{Eq. 54}$$

The UC processor 662 may configure $T_k^{on}$ and $T_k^{off}$ to represent minimum on and off times of a PGU 120A-N k. The manager 646 (by use of the net load modeler 647 and UC modeler 649) may formulate a UC model 660 for the power system 100 according to Eqs. 40-54, which may comprise a UC model with continuous-time generation and ramping trajectory. The UC processor 662 may process the UC model 660 according to an optimization criterion (and/or cost characteristics) to determining the optimal power system configuration 160 for the power system during the operating period. As disclosed above, the power system configuration 160 may balance the continuous-time variations and ramping of load within intervals (e.g., inter-interval variations) by, inter alia, modeling net load and ramping characteristics as cubic splines. The increased accuracy of the net load and/or generation trajectory may improve the performance of the power system 100 during real-time operation by, inter alia, more closely scheduling PGUs 120A-N to satisfy real-time load and/or ramping characteristics.

Figure 7:
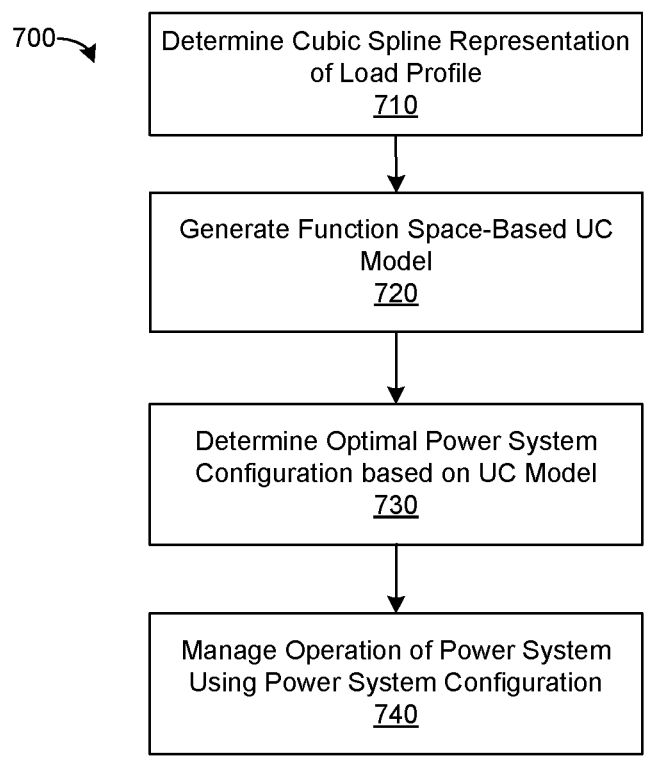
FIG. 7 is a flow diagram of another embodiment of a method for managing a power system.

FIG. 7 is a flow diagram of another embodiment of a method 700 for managing a power system. Step 710 may comprise determining a cubic spline representation of a load profile 154 (a CSRNL 655), as disclosed herein. Step 720 may comprise generating a UC model 660 corresponding to the CSRNL 655, which may comprise incorporating PGU metadata 156A-N, generation and/or ramping trajectory of the PGUs 120A-N (PGUGR 157A-N), and so on. Step 7

Referring to FIGS. 1 and 6, portions of the power system infrastructure 110, such as the power system communication infrastructure 118, control infrastructure 140, monitor 142, load profiler 144, manager 146, manager 646, controller 148, and/or the like, may be embodied as instructions stored on a non-transitory, computer-readable storage medium (e.g., instructions stored on non-transitory storage resources of an MCCD). The instructions may be configured to cause a hardware device, such as an MCCD, to perform operations, processing steps for managing the power system 100, as disclosed herein. In some embodiments, the instructions may be configured for execution by a processor. Execution of the instructions by the processor may be configured to cause the hardware device to perform certain operations and/or processing steps for managing the power system 100. Alternatively, or in addition, the instructions may be configured for execution within a particular execution environment, such as a virtual machine, a Java virtual machine, a scripting environment, and/or the like. In some embodiments, one or more of the instructions may comprise configuration data of a hardware device, such as FPGA configuration data, device firmware, device settings, and/or the like, which may be configured to cause the hardware device to perform certain operations and/or processing steps for managing the power system 100, as disclosed herein.

Portions of the control infrastructure 140, such as the monitor 142, monitoring devices 111A-N, 121A-N, 131A-N, controller 140 (and corresponding elements 142, 144, 146, and so on), may comprise hardware components, which may include, but are not limited to: circuits, programmable logic devices (e.g., field-programmable gate array devices), application-specific integrated circuits, special-purpose hardware devices, monitoring devices, control devices, communication devices, MCCDs, and/or the like.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternative ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of this disclosure.

What is claimed is:

1. A non-transitory, computer-readable storage medium comprising instructions configured to cause a computing device to perform operations for power system management, the operations comprising:
    determining a net load forecast for a power system, the net load forecast corresponding to a sequence of net load samples, each net load sample defining a linear net load on the power system during a respective time interval within an operating period of the power system, wherein determining the net load forecast comprises utilizing a unit commitment model that models a non-linear variance of the linear net load on the power system within one or more time intervals of the net load samples by constructing continuos-time generation and ramping trajectories for the power system, the continuous-time generation and ramping trajectories being included as a part of the net load forecast;
    using the continuous-time generation and ramping trajectories provided by the unit commitment model to configure one or more power generation units to satisfy the determined net load forecast for the power system, including the non-linear variance of the net load modeled within the one or more time intervals by the unit commitment model; and
    configuring the one or more power generator units to generate power in accordance with the continuous-time generation and ramping trajectories during the operating period.

2. The non-transitory computer-readable storage medium of claim 1, further comprising configuring transmission infrastructure of the power system to accept power generated by the one or more power generators during the operating period.

3. The non-transitory computer-readable storage medium of claim 1, wherein an optimal solution to the unit commitment model corresponds to an optimization criterion that includes minimizing a total continuos-time generation cost of power generated during the operating period by the power system.

4. The non-transitory computer-readable storage medium of claim 1, wherein modeling the non-linear variance of the net load comprises projecting the net load samples into a cubic spline function space.

5. The non-transitory computer-readable storage medium of claim 4, wherein formulating the continuous-time generation and ramping trajectories comprises projecting generation trajectories of each of the one or more power generation units into the cubic spline function space.

6. The non-transitory computer-readable storage medium of claim 5, the operations further comprising formulating the unit commitment model in the cubic spline function space.

7. The non-transitory computer-readable storage medium of claim 6, the operations further comprising determining an optimal solution to the unit commitment model, wherein the optimal solution to the unit commitment model determines generation trajectory of the one or more power generation units.

8. The non-transitory computer-readable storage medium of claim 1, wherein the sequence of net load samples comprises an hourly day-ahead load forecast for the power system.

9. The non-transitory, computer-readable storage medium of claim 1, wherein modeling the non-linear variance of the net load comprises a cubic expansion of the net load samples.

10. The non-transitory computer-readable storage medium of claim 1, the operations further comprising:
    acquiring power consumption data indicating the linear net load on the power system at respective sample intervals; and
    determining the sequence of load forecast values based on the acquired power consumption data.

11. A computer system comprising:
    one or more processors; and
    one or more computer-readable hardware storage devices having stored thereon computer-executable instructions that are executable by the one or more processors to cause the computer system to:
        determine a net load forecast for a power system that includes one or more power generation units, wherein:
            the net load forecast corresponds to a sequence of net load samples,
            each net load sample defines a linear net load on the power system during a respective time interval within an operating period of the power system,
            determining the net load forecast comprises utilizing a unit commitment model that models a non-linear variance of the net load on the power system within one or more time intervals of the net load samples by constructing continuous-time generation and ramping trajectories for the power system, the continuous-time generation and ramping trajectories being included as a part of the net load forecast;

use the continuous-time generation and ramping trajectories provided by the unit commitment model to configure the one or more power generation units to satisfy the determined net load forecast for the power system, including the non-linear variance of the net load modeled within the one or more time intervals by the unit commitment model; and configure the one or more power generator units to generate power in accordance with the continuous-time generation and ramping trajectories during the operating period.

12. The computer system of claim 11, wherein the net load forecast is a day-ahead load forecast for the power system.

13. The computer system of claim 11, wherein the unit commitment model is generated, at least in part, using metadata information associated with the power system.

14. The computer system of claim 13, wherein the metadata information includes information describing a topology of the power system, the topology information describing one or more bus locations at which respective power generator units are electrically coupled to a transmission infrastructure of the power system.

15. The computer system of claim 11, wherein a unit commitment processor associated with the unit commitment model is configured to apply continuous-time ramping constraints to the unit commitment model by capping one or more coefficients of a continuous-time ramping trajectory associated with the one or more generator units.

16. The computer system of claim 11, wherein the unit commitment model identifies and models inter-temporal variations in the net load forecast for the power system.

17. The computer system of claim 11, wherein execution of the computer-executable instructions further causes the computer system to:

determine one or more decision variables for the one or more power generator units, wherein the one or more decision variables include an hourly commitment status detailing whether a particular one power generator unit is to be committed for power generation during a particular time period.

18. A method for managing and configuring a power system to respond to changes in load requirements, the method being performed by a computer system and comprising:

determining a net load forecast for a power system, the net load forecast corresponding to a sequence of net load samples, each net load sample defining a linear net load on the power system during a respective time interval within an operating period of the power system, wherein determining the net load forecast further comprises, modeling a non-linear variance of the net load on the power system within one or more time intervals of the net load samples;

formulating a generation trajectory to configure one or more power generation units to satisfy the determined net load forecast for the power system, including the non-linear variance of the net load modeled within the one or more time intervals; and configuring the one or more power generators to generate power in accordance with the determined power generation trajectory during the operating period, wherein modeling the non-linear variance of the net load comprises projecting the net load samples into a cubic spline function space, wherein formulating the generation trajectory comprises projecting generation trajectories of each of a plurality of power generation units into the cubic spline function space, and wherein the operations further comprise formulating a unit commitment model in the cubic spline function space.

19. The method of claim 18, wherein the net load forecast is a day-ahead load forecast for the power system, and wherein the unit commitment model is formulated, at least in part, using metadata information associated with the power system.

20. The method of claim 18, wherein a unit commitment processor associated with the unit commitment model is configured to apply continuous-time ramping constraints to the unit commitment model by capping one or more coefficients of a continuous-time ramping trajectory associated with the one or more generator units.

* * * * *